(12) United States Patent
Miyauchi et al.

(10) Patent No.: US 12,528,526 B2
(45) Date of Patent: Jan. 20, 2026

(54) TRAIN CONTROL SYSTEM

(71) Applicant: Mitsubishi Electric Corporation, Tokyo (JP)

(72) Inventors: Takashi Miyauchi, Tokyo (JP); Shingo Hamada, Tokyo (JP); Takao Tanaka, Tokyo (JP); Ryosuke Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 45 days.

(21) Appl. No.: 18/551,627

(22) PCT Filed: Mar. 31, 2021

(86) PCT No.: PCT/JP2021/013960
§ 371 (c)(1),
(2) Date: Sep. 21, 2023

(87) PCT Pub. No.: WO2022/208781
PCT Pub. Date: Oct. 6, 2022

(65) Prior Publication Data
US 2024/0174275 A1    May 30, 2024

(51) Int. Cl.
*B61L 23/14*    (2006.01)
*B61L 27/10*    (2022.01)

(52) U.S. Cl.
CPC .............. *B61L 23/14* (2013.01); *B61L 27/10* (2022.01)

(58) Field of Classification Search
CPC ........ B61L 23/14; B61L 27/10; B61L 23/042; B61L 25/021; B61L 15/0027; B61L 23/00; B61L 27/20; B60L 15/40
See application file for complete search history.

(56) References Cited

U.S. PATENT DOCUMENTS 9,505,420 B2    11/2016  Tsukamoto
2004/0267415 A1  12/2004  Lacote et al.
(Continued)

FOREIGN PATENT DOCUMENTS

EP    1498338 A1    1/2005
WO    2013047390 A1    4/2013
(Continued)

OTHER PUBLICATIONS

International Search Report (PCT/ISA/210) with translation and Written Opinion (PCT/ISA/237) mailed on Jun. 22, 2021, by the Japan Patent Office as the International Searching Authority for International Application No. PCT/JP2021/013960. (8 pages).
(Continued)

*Primary Examiner* — Joseph J Dallo
(74) *Attorney, Agent, or Firm* — Buchanan Ingersoll & Rooney PC

(57) ABSTRACT

A first on-board device installed on a first train controls an emergency brake unit. When it is determined that an actual deceleration value is insufficient in comparison with a predetermined emergency brake reference deceleration value, the first on-board device predicts a first stop location based on the actual deceleration value, and sends, to a ground control device, a first signal indicating insufficient deceleration and a first stop location signal representing the first stop location predicted. The ground control device sends the first signal and the first stop location signal to a second on-board device of a second train traveling ahead of the first train. The second on-board device invalidates a preset first run curve, over a range from a second train location representing an on-track location of the second train to a stop limit location of the second train, and generates a second run curve to control the second train.

8 Claims, 9 Drawing Sheets

(56) References Cited

U.S. PATENT DOCUMENTS

| | | | | |
|---|---|---|---|---|
| 2016/0091593 A1* | 3/2016 | Millman | ................ | B61L 27/70 |
| | | | | 701/408 |
| 2016/0094950 A1* | 3/2016 | Millman | ............... | H04W 4/026 |
| | | | | 455/456.1 |
| 2016/0094954 A1* | 3/2016 | Millman | ................ | H04W 4/80 |
| | | | | 455/456.2 |
| 2020/0172133 A1* | 6/2020 | Abrosimov | ......... | B61L 15/0027 |
| 2021/0229715 A1* | 7/2021 | Abrosimov | ......... | B61L 15/0072 |

FOREIGN PATENT DOCUMENTS

| | | | | |
|---|---|---|---|---|
| WO | WO-2016038957 A1 * | 3/2016 | .............. | B60L 15/40 |
| WO | WO-2016198240 A1 * | 12/2016 | .............. | B61L 21/04 |
| WO | WO-2018088366 A1 * | 5/2018 | .............. | B60L 15/40 |
| WO | WO-2019016996 A1 * | 1/2019 | .......... | B61L 15/0081 |
| WO | WO-2022208781 A1 * | 10/2022 | .............. | B60L 15/40 |

OTHER PUBLICATIONS

Office Action dated Nov. 19, 2025, issued in the corresponding Indian Patent Application No. 202327063880, 5 pages.

\* cited by examiner

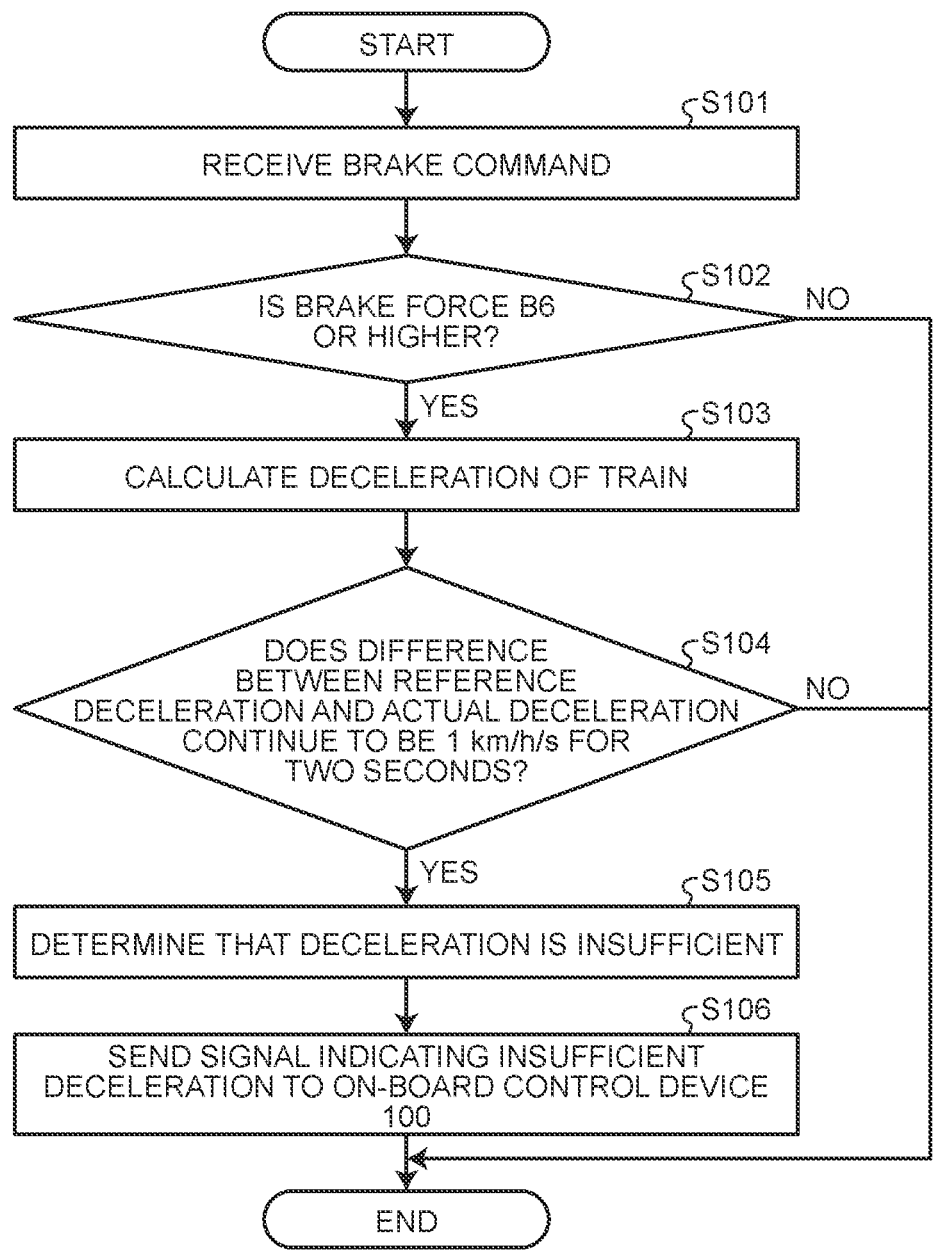

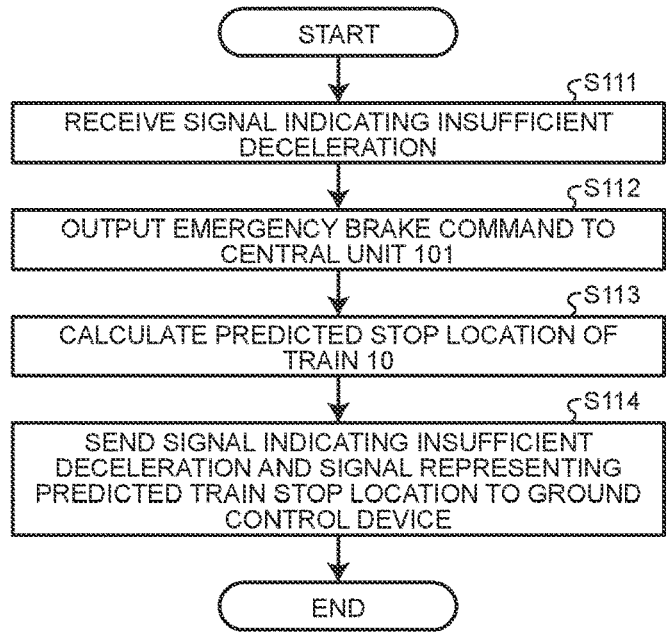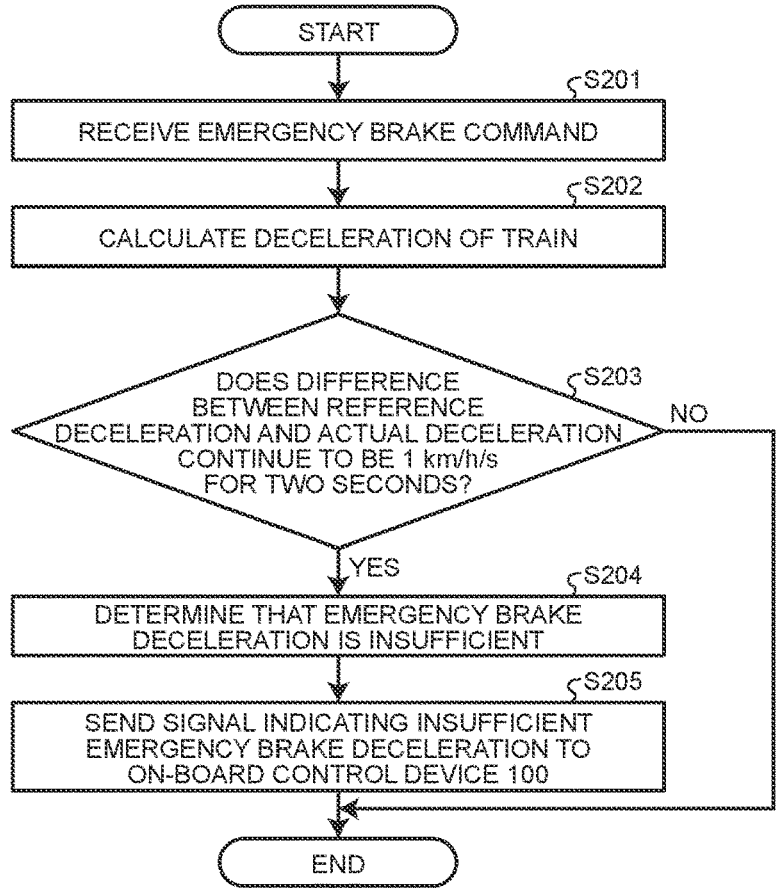

TRAIN CONTROL SYSTEM

FIELD

The present disclosure relates to a train control system using wireless communication.

BACKGROUND

In a conventional train control system that uses wireless communication, an on-board control device installed on a train detects the location and the speed of that train, and sends information about the location and the speed of that train to a ground control device using wireless communication. The ground device performs travel control to ensure safe travel of trains based on the information about the train location and the speed received. The train control system of Patent Literature 1 sets a safety buffer in both of the travel direction of a train and the direction opposite the travel direction. The safety buffer is set to have a longer distance when the train is traveling thereby to provide safe travel control of train.

CITATION LIST

Patent Literature

Patent Literature 1: WO 2013/047390 A

SUMMARY OF INVENTION

Problem to be Solved by the Invention

However, a train may fail to decelerate sufficiently in a case of a snowfall or the like. In such case, a train traveling nearby also needs to be controlled for safe travel control of train. There is a problem in that such situation is not taken into consideration in Patent Literature 1.

The present disclosure has been made to solve a problem such as one described above, and it is an object of the present disclosure to provide a train control system capable of providing safe travel control of a train traveling nearby when a train under insufficient deceleration is present on the track.

Means to Solve the Problem

In order to solve the above-described problem and achieve the object, a train control system according to the present disclosure includes: a first on-board device installed on a first train; a second on-board device installed on a second train, the second train traveling in a travel direction identical to a travel direction of the first train and traveling ahead of the first train; and a ground control device to provide control of the first train and of the second train based on an on-track location of the first train calculated in the first on-board device and on an on-track location of the second train calculated in the second on-board device. The first on-board device generates an emergency brake command to control an emergency brake unit installed on the first train when it is determined that an actual deceleration value of the first train is insufficient in comparison with a predetermined reference deceleration value, and the first on-board device predicts a first stop location of the first train based on the actual deceleration value, and sends a first signal indicating insufficient deceleration and a first stop location signal representing the first stop location predicted to the ground control device when it is determined that the actual deceleration value of the first train is insufficient in comparison with a predetermined emergency brake reference deceleration value, the ground control device receives the first signal and the first stop location signal from the first on-board device, and sends the first signal and the first stop location signal to the second on-board device, and the second on-board device receives the first signal and the first stop location signal from the ground control device, invalidates a first run curve that has been preset, over a range from a second train location to a stop limit location of the second train, and generates a second run curve to control the second train, the second train location representing the on-track location of the second train, the second run curve being different from the first run curve.

Effects of the Invention

A train control system according to the present disclosure includes: a first on-board device installed on a first train; a second on-board device installed on a second train, the second train traveling in a travel direction identical to a travel direction of the first train and traveling ahead of the first train; and a ground control device to provide control of the first train and of the second train based on an on-track location of the first train calculated in the first on-board device and on an on-track location of the second train calculated in the second on-board device. The first on-board device generates an emergency brake command to control an emergency brake unit installed on the first train when it is determined that an actual deceleration value of the first train is insufficient in comparison with a predetermined reference deceleration value, and the first on-board device predicts a first stop location of the first train based on the actual deceleration value, and sends a first signal indicating insufficient deceleration and a first stop location signal representing the first stop location predicted to the ground control device when it is determined that the actual deceleration value of the first train is insufficient in comparison with a predetermined emergency brake reference deceleration value, the ground control device receives the first signal and the first stop location signal from the first on-board device, and sends the first signal and the first stop location signal to the second on-board device, and the second on-board device receives the first signal and the first stop location signal from the ground control device, invalidates a first run curve that has been preset, over a range from a second train location to a stop limit location of the second train, and generates a second run curve to control the second train, the second train location representing the on-track location of the second train, the second run curve being different from the first run curve. This can provide safe travel control of a train traveling nearby.

BRIEF DESCRIPTION OF DRAWINGS

FIG. 3 is a flowchart illustrating an operation of a central unit of the train control system 1 according to the first embodiment.

FIG. 4 is a flowchart illustrating an operation of an on-board control device of the train control system 1 according to the first embodiment.

FIG. 5 is a flowchart illustrating another operation of the central unit of the train control system 1 according to the first embodiment.

DESCRIPTION OF EMBODIMENTS

Figure 1:
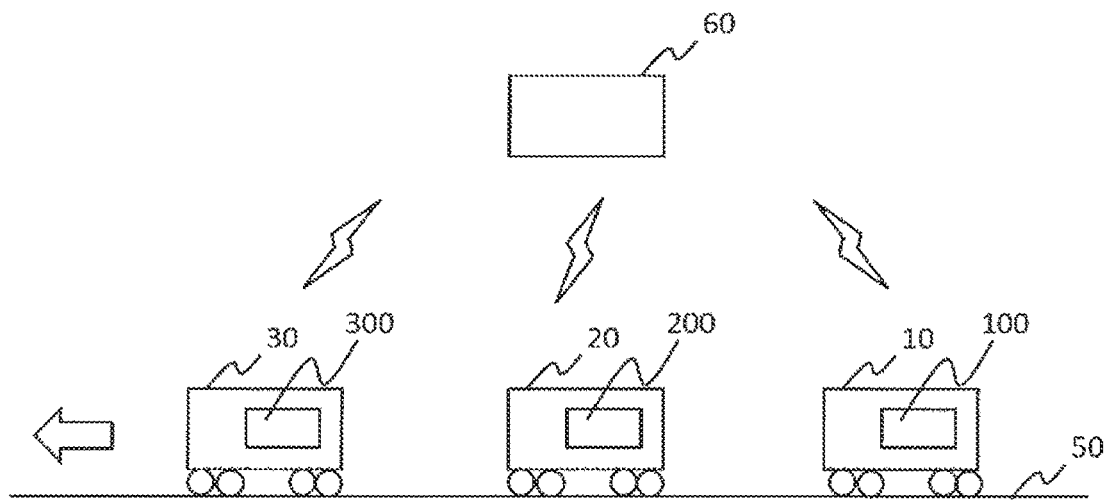
FIG. 1 is a diagram illustrating a schematic configuration of a train control system 1 according to a first embodiment.

Embodiments of a train control system according to the present disclosure will be described below with reference to the drawings. Note that, in the drawings, the same or equivalent parts are designated by like reference characters.

First Embodiment

FIG. 1 is a configuration diagram of a train control system 1 according to a first embodiment. The train control system 1 illustrated in FIG. 1 is configured to include a ground control device 60, an on-board control device 100 installed on a train 10, an on-board control device 200 installed on a train 20, and an on-board control device 300 installed on a train 30. The train 10, the train 20, and the train 30 are traveling on a track 50 in the arrow direction.

The ground control device 60 receives train location information from each of the train 10, the train 20, and the train 30 via a wireless base station (not illustrated) and via an on-board wireless station (described later) to know the location of each train from the train location information received. The ground control device 60 calculates stop limit information of each train based on the location information obtained from each train, and sends the stop limit information to each train via the wireless base station (not illustrated) and via the on-board wireless station (described later). As used herein, the term stop limit information refers to information representing the range in which the train can travel in safety. The stop limit information is, for example, stop limit location information representing the most distant location to which the train 10 is permitted to travel, calculated from the location information of a preceding train traveling ahead of the train 10, and/or another similar information.

The train 10 includes the on-board control device 100, and sends the train location information calculated by the on-board control device 100 to the ground control device 60 via the on-board wireless station (described later) and via the wireless base station (not illustrated). In addition, the train 10 receives the stop limit information from the ground control device 60 via the on-board wireless station (described later) and via the wireless base station (not illustrated). The train 10 travels or stops based on the stop limit information received.

The train 20 is a train traveling in the same travel direction as the travel direction of the train 10, and is a train traveling ahead of the train 10. The train 20 includes the on-board control device 200, and sends the train location information calculated by the on-board control device 200 to the ground control device 60 via the on-board wireless station (described later) and via the wireless base station (not illustrated). In addition, the train 20 receives the stop limit information from the ground control device 60 via the on-board wireless station (described later) and via the wireless base station (not illustrated). The train 20 travels or stops based on the stop limit information received.

The train 30 is a train traveling in the same travel direction as the travel direction of the train 10 and of the train 20, and is a train traveling ahead of the train 20. The train 30 includes the on-board control device 300, and sends the train location information calculated by the on-board control device 300 to the ground control device 60 via the on-board wireless station (described later) and via the wireless base station (not illustrated). In addition, the train 30 receives the stop limit information from the ground control device 60 via the on-board wireless station (described later) and via the wireless base station (not illustrated). The train 30 travels or stops based on the stop limit information received.

For simplicity of illustration, it is assumed here that there is no other train traveling between the train 10 and the train 20. Similarly, it is assumed that there is no other train between the train 20 and the train 30.

Figure 2:
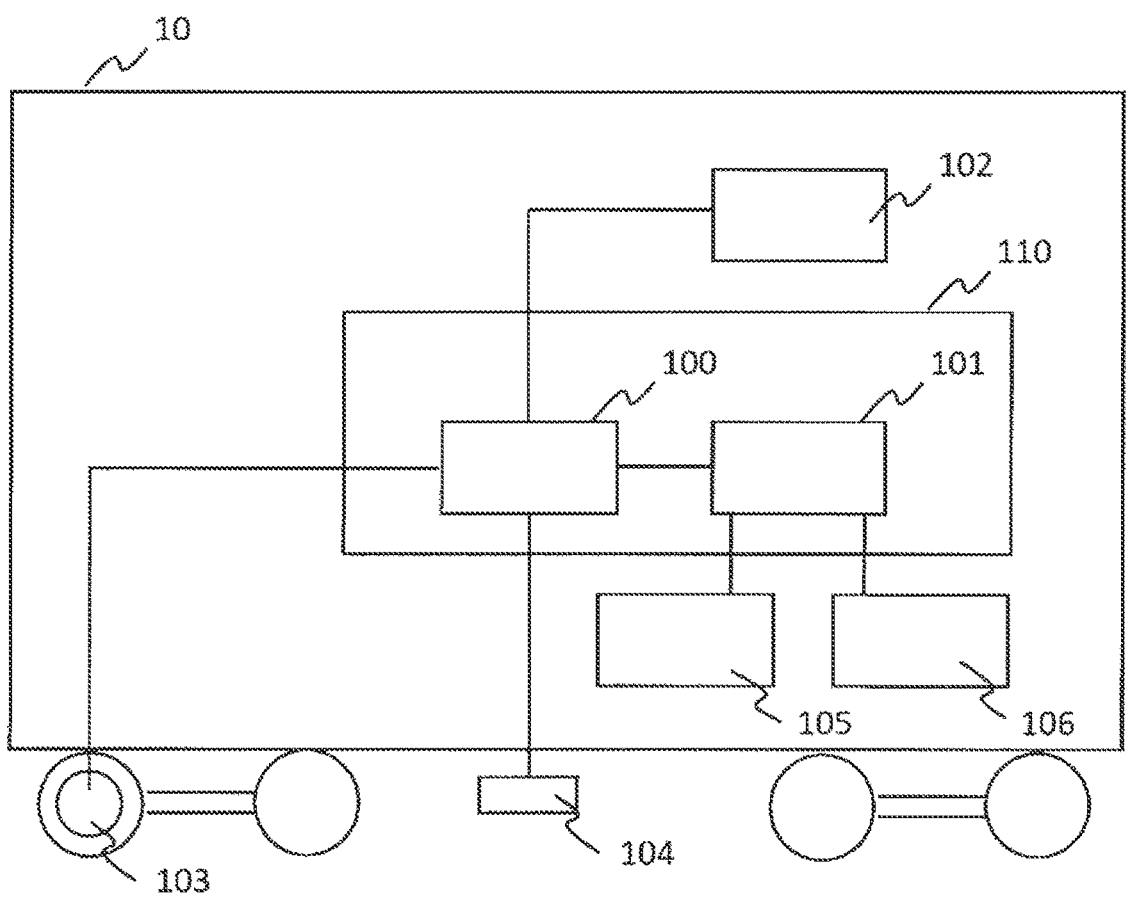
FIG. 2 is a diagram illustrating a schematic configuration of a vehicle of a train traveling in the train control system 1 according to the first embodiment.

FIG. 2 is a diagram illustrating a configuration of a vehicle of the train 10 traveling in the train control system 1 according to the first embodiment. Note that FIG. 2 illustrates only devices needed for description of the train control system 1 according to the present first embodiment. Other devices and/or functions may also be installed thereon.

The vehicle illustrated in FIG. 2 includes an on-board device 110 including the on-board control device 100 and a central unit 101, an on-board wireless station 102, a tachometer generator 103, a pickup coil 104, a brake control device 105, and an emergency brake control device 106.

The on-board control device 100 is connected to the central unit 101, and outputs a power-running command, a brake command, and an emergency brake command generated by the on-board control device 100, to the central unit. The on-board control device 100 is also connected to the on-board wireless station 102, to the tachometer generator 103, and to the pickup coil 104. The on-board control device 100 calculates the speed, the travel distance, and the like of the train 10 based on the number of pulses obtained from the tachometer generator 103 and on the diameter of the wheels of the train 10. The on-board control device 100 also calculates the location of the train 10 using a message obtained from the pickup coil 104, i.e., location information of a wayside coil (not illustrated) installed along the track on which the train travels. The on-board control device 100 sends information on the location of the train 10 calculated and the like, to the ground control device 60 via the on-board wireless station 102.

The on-board control device 100 generates a stop-deceleration pattern (i.e., run curve) using the stop limit information of the train 10 obtained from the ground control device 60 via the on-board wireless station 102 and other information, and controls traveling of the train 10 using the stop-deceleration pattern generated.

The central unit 101 is connected to a cab (not illustrated) of the train 10, and receives a power-running command and a brake command from the cab. The central unit 101 is also connected to the on-board control device 100, and receives a power-running command, a brake command, and an emergency brake command generated by the on-board control device 100, thereby enabling autonomous operation to be provided. The central unit 101 is connected to a drive control device (not illustrated) installed on the train 10, to the brake control device 105, and to the emergency brake control device 106 to provide control of traveling and braking based on the power-running command and on the brake command input to the central unit 101.

The central unit 101 is constantly aware of the speed of the train 10. For example, the central unit 101 calculates the average of the past two seconds every second to be aware of the speed.

The central unit 101 includes a storage unit. The storage unit stores deceleration values of the train associated with respective brake commands. The storage unit stores deceleration values associated with respective brake forces, e.g., a deceleration value associated with brake force B4, a deceleration value associated with brake force B6, etc. A deceleration value is a negative acceleration value of decrease in the speed of the train 10 when, for example, the brake unit has been activated. The deceleration value is expressed by a decrease in a speed per hour in one second (km/h/s). In this respect, brake force B4 and brake force B6 correspond to brake commands for different brake force magnitudes. The deceleration values stored in the storage unit are herein each referred to as reference deceleration value. A reference deceleration value is a deceleration value that serves as a reference value associated with each brake force when a brake command is input in normal condition.

The on-board wireless station 102 is connected to the on-board control device 100, and receives information such as the train location information from the on-board control device 100. The train location information received is sent to the ground control device 60 via the wireless base station installed on the ground and connected to the ground control device 60.

The tachometer generator 103 generates as many pulses as a number corresponding to the rotational speed of a wheel of the train 10, and outputs the pulses generated, to the on-board control device 100.

The pickup coil 104 receives a message from the wayside coil installed on the ground, and outputs information in the message to the on-board control device 100. Examples of the message received by the pickup coil 104 from the wayside coil include location information representing the location where the wayside coil is installed.

The brake control device 105 is a brake unit for decelerating the train 10 according to a brake command generated by the on-board control device 100. The brake control device 105 is what is usually called a normal brake, which is used for deceleration and stopping in normal operation.

The emergency brake control device 106 is a brake unit for decelerating the train 10 according to an emergency brake command generated by the on-board control device 100. The emergency brake control device 106 is a brake unit that provides braking force larger than the braking force of the brake control device 105, and is used in an emergency case.

An operation of the train control system 1 according to the first embodiment will next be described. FIG. 3 is a diagram that describes a first operation of the central unit 101 of the train control system 1 according to the first embodiment. The central unit 101 receives a brake command from the on-board control device 100 (S101). Next, the central unit 101 determines whether the brake command received is a brake command specifying a brake force higher than or equal to brake force B6 (S102). When the brake command received is not a brake command higher than or equal to brake force B6 (S102: N), the central unit 101 terminates the process. When the brake command received is a brake command higher than or equal to brake force B6 (S102: Y), the central unit 101 calculates the deceleration value from the speed of the train 10 (S103). The deceleration value calculated is herein referred to as actual deceleration value. The central unit 101 compares the actual deceleration value with the reference deceleration value stored in advance in the storage unit, and determines whether the difference between the reference deceleration value and the actual deceleration value continues to be greater than or equal to a predetermined threshold for a specific time period (S104). Although this example assumes a predetermined threshold of, for example, 1 km/h/s, the threshold can be set appropriately. In addition, although this example assumes a specific time period of, for example, 2 seconds, the time period can be set appropriately. When the difference between the reference deceleration value and the actual deceleration value does not continue to be greater than or equal to the predetermined threshold for the specific time period (S104: N), the central unit 101 determines that sufficient deceleration has been achieved, and terminates the process. When the difference between the reference deceleration value and the actual deceleration value continues to be greater than or equal to the predetermined threshold for the specific time period (S104: Y), the central unit 101 determines that sufficient deceleration has not been achieved, that is, deceleration is insufficient (S105). When the central unit 101 determines that deceleration is insufficient, the central unit 101 sends a signal indicating insufficient deceleration to the on-board control device 100 (S106), and terminates the process. In this respect, the operation at S104 may be a comparison with respect to a ratio between the reference deceleration value and the actual deceleration value rather than a comparison with respect to the difference between the reference deceleration value and the actual deceleration value.

FIG. 4 is a diagram that describes a first operation of the on-board control device 100 of the train control system 1 according to the first embodiment. The on-board control device 100 receives the signal indicating insufficient deceleration from the central unit 101 (S111). Next, the on-board control device 100 generates an emergency brake command, sends the emergency brake command to the central unit 101 (S112), and terminates the process.

FIG. 5 is a diagram that describes a second operation of the central unit 101 of the train control system 1 according to the first embodiment. The central unit 101 receives an emergency brake command from the on-board control device 100 (S201). The central unit 101 calculates a deceleration value from the speed of the train 10 (S202). The deceleration value calculated is herein referred to as actual deceleration value. The central unit 101 compares the actual deceleration value with an emergency brake reference deceleration value stored in advance in the storage unit, and determines whether the difference between the emergency brake reference deceleration value and the actual deceleration value continues to be greater than or equal to a predetermined threshold for a specific time period (S203). In this respect, the emergency brake reference deceleration value is a deceleration value that will be obtained when an emergency brake command is input in normal condition. Although this example assumes a predetermined threshold of, for example, 1 km/h/s, the threshold can be set appropriately. In addition, although this example assumes a specific time period of, for example, 2 seconds, the time period can be set appropriately. When the difference between the emergency brake reference deceleration value and the actual deceleration value does not continue to be greater than or equal to the predetermined threshold for the specific time period (S203: N), the central unit 101 determines that sufficient deceleration has been achieved, and terminates the process. When the difference between the emergency brake reference deceleration value and the actual deceleration value continues to be greater than or equal to the predetermined threshold for the specific time period (S203: Y), the central unit 101 determines that sufficient deceleration has not been achieved, that is, deceleration is insufficient (S204). When the central unit 101 determines that deceleration is insufficient, the central unit 101 sends a signal indicating insufficient emergency brake deceleration to the on-board control device 100 (S205), and terminates the process. In this operation, the comparison may be made with respect to a ratio between the emergency brake reference deceleration value and the actual deceleration value rather than with respect to the difference between the emergency brake reference deceleration value and the actual deceleration value.

Figure 6:
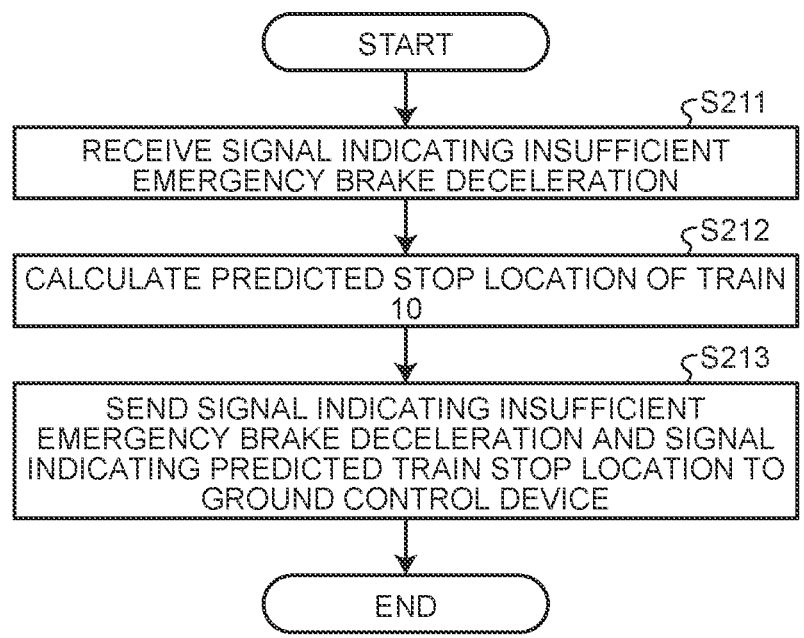
FIG. 6 is a flowchart illustrating another operation of the on-board control device of the train control system 1 according to the first embodiment.

FIG. 6 is a diagram that describes a second operation of the on-board control device 100 of the train control system 1 according to the first embodiment. The on-board control device 100 receives the signal indicating insufficient emergency brake deceleration from the central unit 101 (S211). Next, the on-board control device 100 calculates a predicted location where the train 10 will stop, based on the train location and on the actual deceleration value of the train 10 (S212). The on-board control device 100 generates the signal indicating insufficient emergency brake deceleration and a stop location signal representing a predicted train stop location, sends these signals to the ground control device 60 via the on-board wireless station 102 (S213), and terminates the process.

Figure 7:
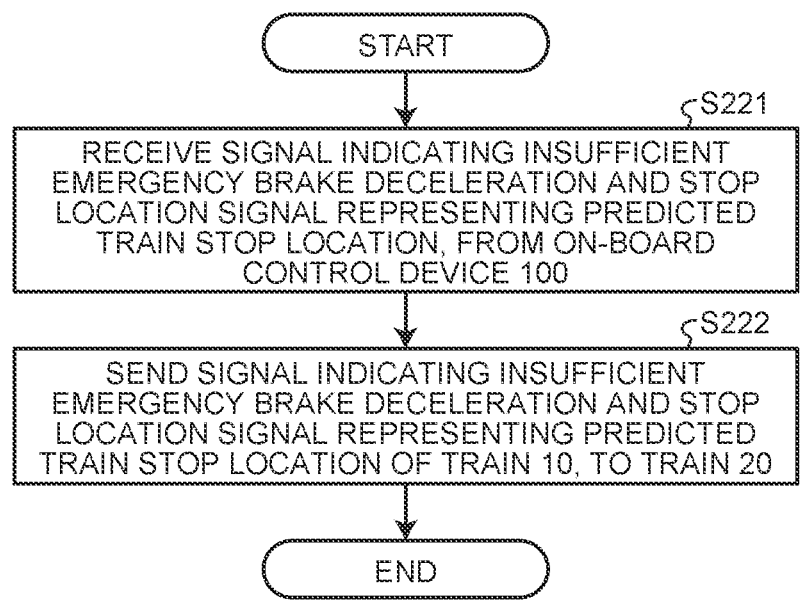
FIG. 7 is a flowchart illustrating an operation of a ground control device of the train control system 1 according to the first embodiment.

FIG. 7 is a diagram that describes a second operation of the ground control device 60 of the train control system 1 according to the first embodiment. The ground control device 60 receives, via the wireless base station, the signal indicating insufficient emergency brake deceleration of the train 10 and the stop location signal representing the predicted train stop location of the train 10, sent from the on-board control device 100 of the train 10 (S221). Next, the ground control device 60 sends the signal indicating insufficient emergency brake deceleration of the train 10 and the stop location signal representing the predicted train stop location of the train 10, to the train 20, which is a preceding train of the train 10, via the wireless base station (S222), and terminates the process.

Figure 8:
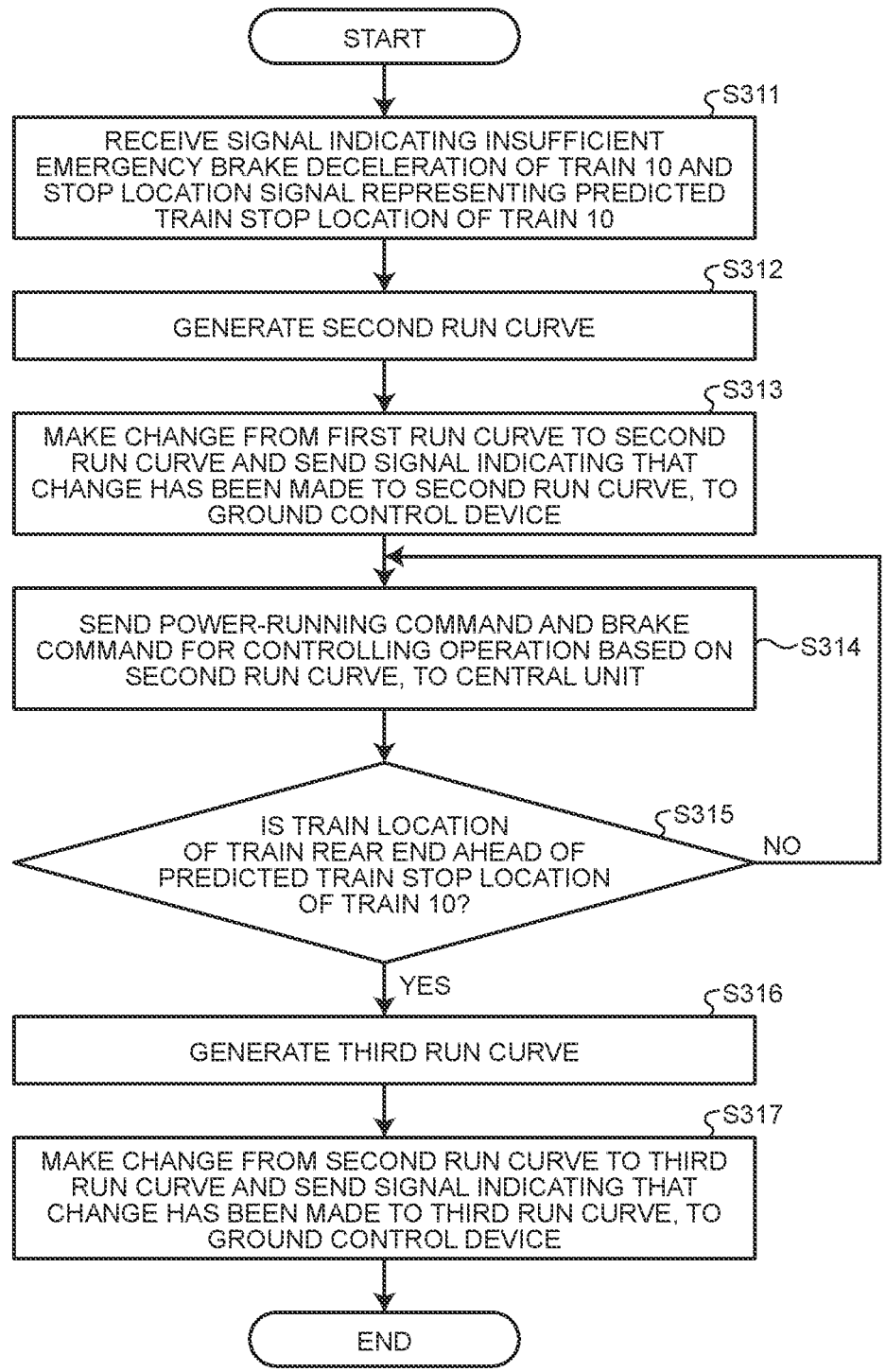
FIG. 8 is a flowchart illustrating an operation of an on-board control device of the train control system 1 according to the first embodiment.

FIG. 8 is a diagram that describes an operation of the on-board control device 200 of the train control system 1 according to the first embodiment. The on-board control device 200 receives the signal indicating insufficient emergency brake deceleration of the train 10 and the stop location signal representing the predicted train stop location of the train 10 from the ground control device 60 (S311). Next, the on-board control device 200 generates a second run curve (S312), changes the run curve to be set from a first run curve to the second run curve, and sends a signal indicating that the run curve has been changed to the second run curve, to the ground control device 60 (S313). The on-board control device 200 sends a power-running command and a brake command for controlling the train according to the second run curve, to the central unit of the train 20 (S314). The on-board control device 200 compares the train location of the train rear end of the train 20 with the predicted train stop location of the train 10 received from the ground control device 60, and determines whether the train location of the train rear end of the train 20 is ahead of the predicted train stop location of the train 10 in the train travel direction (S315). When the on-board control device 200 determines that the train location of the train rear end of the train 20 is not ahead of the predicted train stop location of the train 10 (S315: N), the on-board control device 200 continues to control the train according to the second run curve. When the on-board control device 200 determines that the train location of the train rear end of the train 20 is ahead of the predicted train stop location of the train 10 (S315: Y), the on-board control device 200 generates a third run curve (S316). The on-board control device 200 changes the run curve to be set from the second run curve to the third run curve, sends a signal indicating that the run curve has been changed to the third run curve, to the ground control device 60 (S317), and terminates the process.

The run curves will next be described. The first run curve is the run curve that has been set since before the signals about the train 10 were received from the ground control device 60. The train 20 controls the train according to the first run curve before reception of the signals about the train 10 from the ground control device 60.

The second run curve is the run curve that is set after reception of the signals about the train 10 from the ground control device 60. The train 20 controls the train according to the second run curve after reception of the signals about the train 10 from the ground control device 60. The second run curve is a run curve that is set to increase the train distance from the train 10. For example, the second run curve is a run curve that has taken into account control to increase the speed of the train, control to terminate a deceleration condition when in the deceleration condition, or the like after reception of the signals about the train 10 from the ground control device 60. Generation of such run curve can increase the train distance between the train 10 and the train 20.

The third run curve is a run curve that is set when it is determined that the location of the train rear end of the train 20 has passed the predicted train stop location of the train 10, and is a run curve newly generated based on the current train location of the train 20 and on the stop limit information sent from the ground control device 60.

The train 20 notifies the ground control device 60 of the change in the run curve from the first run curve to the second run curve, and can thus notify the ground control device 60 of start of traveling in an emergency escape mode. The train 20 also notifies the ground control device 60 of the change in the run curve from the second run curve to the third run curve, and can thus notify the ground control device 60 of termination of traveling in the emergency escape mode.

In this process, the train position at the train rear end is calculated based on the train location calculated by the on-board control device 200 and on the train length stored in advance.

Figure 9:
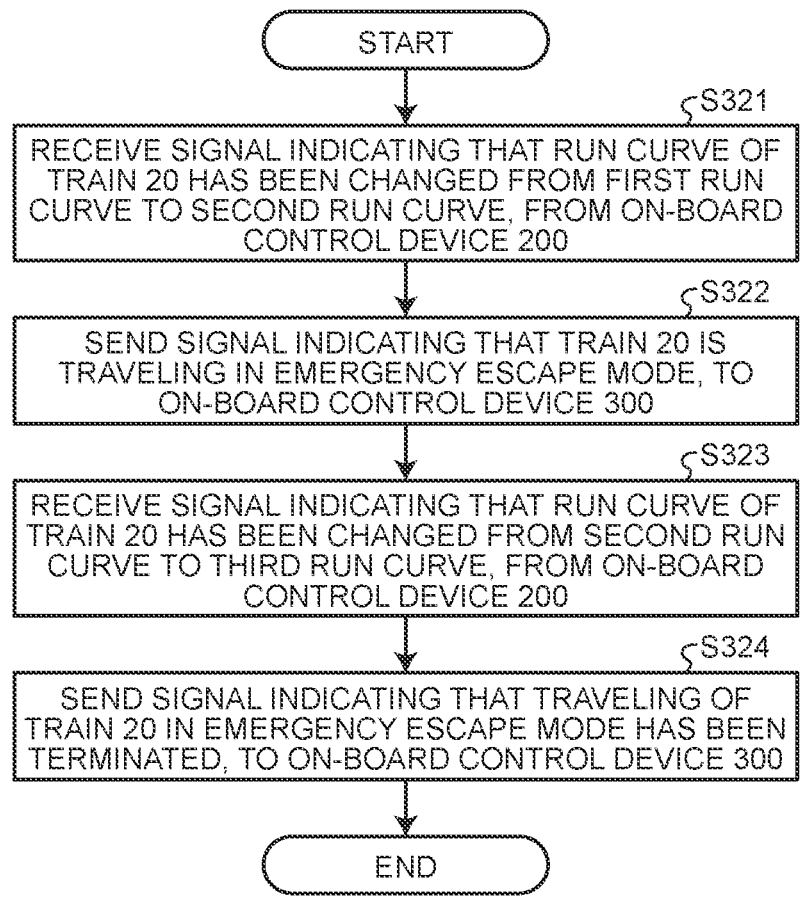
FIG. 9 is a flowchart illustrating an operation of the ground control device of the train control system 1 according to the first embodiment.

FIG. 9 is a diagram that describes a third operation of the ground control device 60 of the train control system 1 according to the first embodiment. The ground control device 60 receives, from the on-board control device 200 of the train 20, the signal indicating that the run curve of the train 20 has been changed from the first run curve to the second run curve (S321). The ground control device 60 sends a signal indicating that the train 20 is traveling in the emergency escape mode, to the on-board control device 300 of the train 30 (S322). The ground control device 60 receives, from the on-board control device 200 of the train 20, a signal indicating that the run curve of the train 20 has been changed from the second run curve to the third run curve (S323). The ground control device 60 sends, to the on-board control device 300 of the train 30, a signal indicating that traveling of the train 20 in the emergency escape mode has been terminated (S324), and terminates the process.

The train control system according to the first embodiment includes a first on-board device installed on a first train, a second on-board device installed on a second train traveling in a travel direction identical to a travel direction of the first train and traveling ahead of the first train, and a ground control device that provides control of the first train and of the second train based on an on-track location of the first train calculated in the first on-board device and on an on-track location of the second train calculated in the second on-board device, where, in the train control system, the first on-board device generates an emergency brake command to control an emergency brake unit installed on the first train when it is determined that an actual deceleration value of the first train is insufficient in comparison with a predetermined reference deceleration value, and the first on-board device predicts a first stop location of the first train based on the actual deceleration value, and sends, to the ground control device, a first signal indicating insufficient deceleration and a first stop location signal representing the first stop location predicted, when it is determined that the actual deceleration value of the first train is insufficient in comparison with a predetermined emergency brake reference deceleration value; the ground control device receives the first signal and the first stop location signal from the first on-board device, and sends the first signal and the first stop location signal to the second on-board device; and the second on-board device receives the first signal and the first stop location signal from the ground control device, invalidates a first run curve that has been preset, over a range from a second train location representing an on-track location of the second train to a stop limit location of the second train, and generates a second run curve different from the first run curve to control the second train. This can provide safe travel control of a train traveling nearby.

In the train control system according to the first embodiment, the second run curve is a run curve to provide control such that a train distance between the second train and the first train becomes larger than the train distance between the second train and the first train when the second train is controlled based on the first run curve. This can provide safe travel control of a train traveling nearby.

In the train control system according to the first embodiment, the first on-board device determines that deceleration is insufficient when the difference between the emergency brake reference deceleration value and the actual deceleration value continues to be greater than or equal to a predetermined threshold for a predetermined time period. This can provide safe travel control of a train traveling nearby.

In the train control system according to the first embodiment, the second on-board device invalidates the second run curve, and generates a third run curve to control the second train when the second on-board device detects that the tail location of the second train has passed the first stop location. This can provide safe travel control of a train traveling nearby.

Second Embodiment

Figure 10:
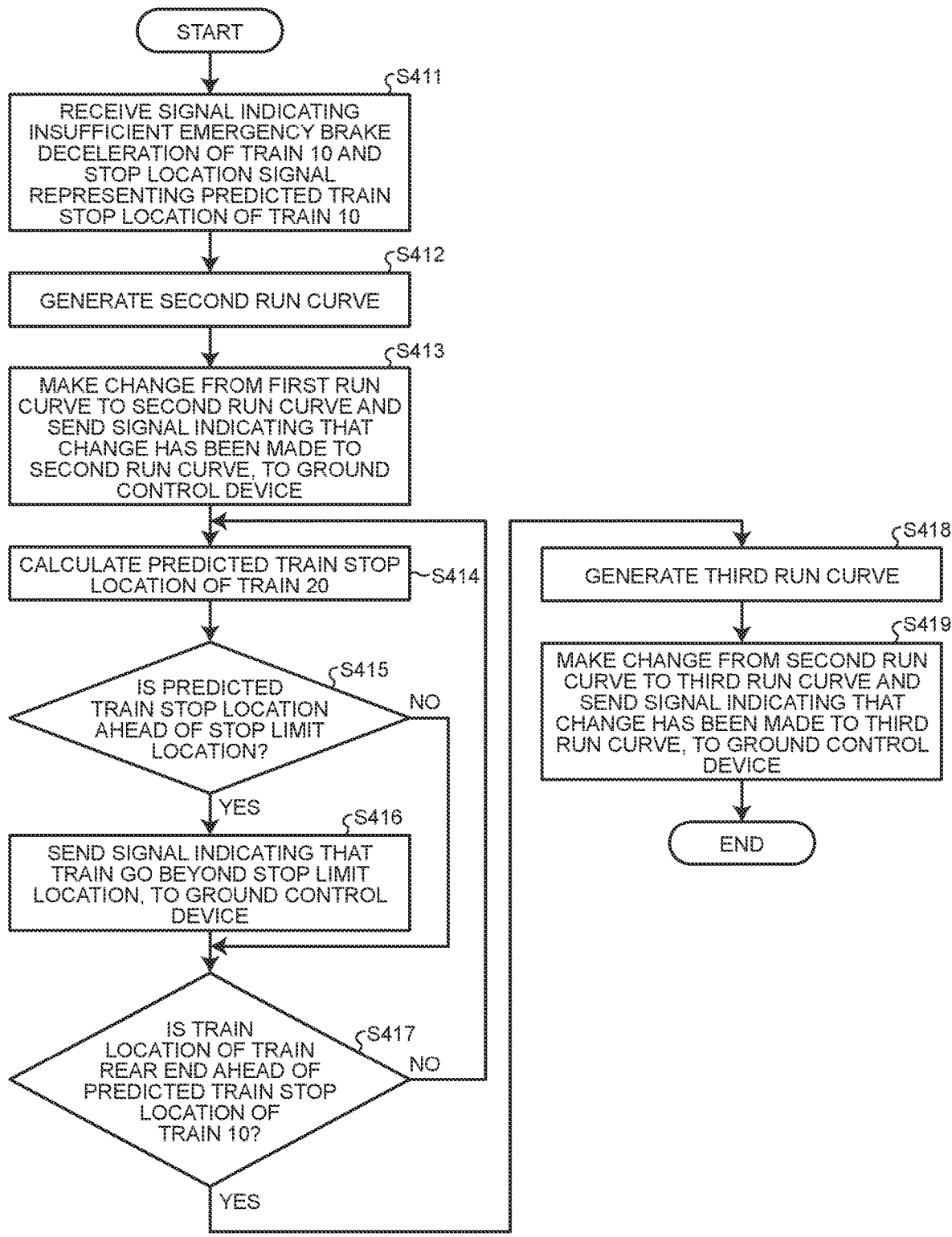
FIG. 10 is a flowchart illustrating an operation of the on-board control device of the train control system 1 according to a second embodiment.

FIG. 10 is a diagram that describes an operation of the on-board control device 200 of the train control system 1 according to a second embodiment. The on-board control device 200 receives a signal indicating insufficient emergency brake deceleration of the train 10 and a stop location signal representing a predicted train stop location of the train 10 from the ground control device 60 (S411). Next, the on-board control device 200 generates a second run curve (S412), changes the run curve to be set from the first run curve to the second run curve, and sends a signal indicating that the run curve has been changed to the second run curve, to the ground control device 60 (S413). The on-board control device 200 calculates a predicted train stop location of the train 20 based on the second run curve (S414). The on-board control device 200 compares the predicted train stop location of the train 20 with the stop limit location sent from the ground control device 60, and determines whether the predicted train stop location of the train 20 is ahead of the stop limit location in the train travel direction (S415). When the on-board control device 200 determines that the predicted train stop location of the train 20 is ahead of the stop limit location (S415: Y), the on-board control device 200 sends a signal indicating that the train 20 goes beyond the stop limit location, to the ground control device 60 (S416). When the on-board control device 200 determines that the predicted train stop location of the train 20 is not ahead of the stop limit location (S415: N), the process proceeds to S417. The on-board control device 200 compares the train location of the train rear end of the train 20 with the predicted train stop location of the train 10 received from the ground control device 60, and determines whether the train location of the train rear end of the train 20 is ahead of the predicted train stop location of the train 10 in the train travel direction (S417). When the on-board control device 200 determines that the train location of the train rear end of the train 20 is not ahead of the predicted train stop location of the train 10 (S417: N), the on-board control device 200 continues to control the train according to the second run curve. When the on-board control device 200 determines that the train location of the train rear end of the train 20 is ahead of the predicted train stop location of the train 10 (S417: Y), the on-board control device 200 generates a third run curve (S418). The on-board control device 200 changes the run curve to be set from the second run curve to the third run curve, sends a signal indicating that the run curve has been changed to the third run curve, to the ground control device 60 (S419), and terminates the process.

Figure 11:
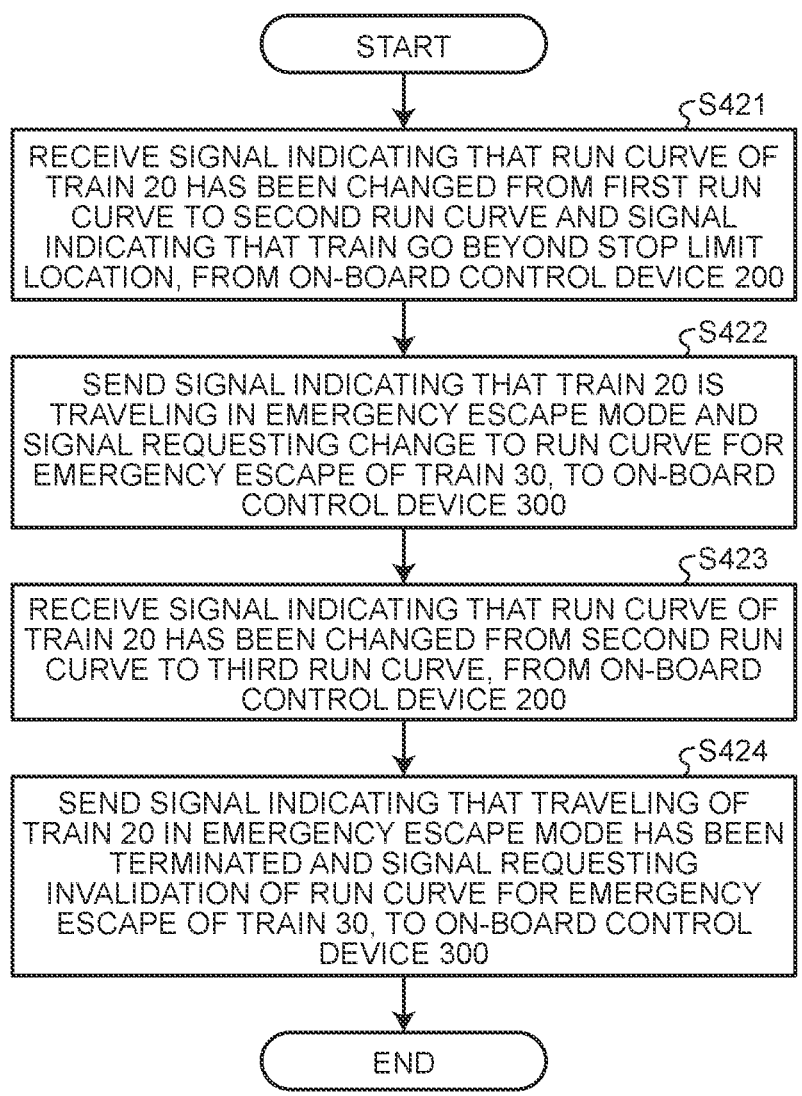
FIG. 11 is a flowchart illustrating an operation of the ground control device of the train control system 1 according to the second embodiment.

FIG. 11 is a diagram that describes an operation of the ground control device 60 of the train control system 1 according to the second embodiment. The ground control device 60 receives, from the on-board control device 200 of the train 20, the signal indicating that the run curve of the train 20 has been changed from the first run curve to the second run curve and the signal indicating that the train 20 goes beyond the stop limit location (S421). The ground control device 60 sends, to the on-board control device 300 of the train 30, a signal indicating that the train 20 is traveling in the emergency escape mode, and a signal requesting a change of the run curve to a run curve for emergency escape of the train 30 (S422). The ground control device 60 receives, from the on-board control device 200 of the train 20, a signal indicating that the run curve of the train 20 has been changed from the second run curve to the third run curve (S423). The ground control device 60 sends, to the on-board control device 300 of the train 30, a signal indicating that traveling of the train 20 in the emergency escape mode has been terminated, and a signal requesting invalidation of the run curve for emergency escape (S424), and terminates the process.

Figure 12:
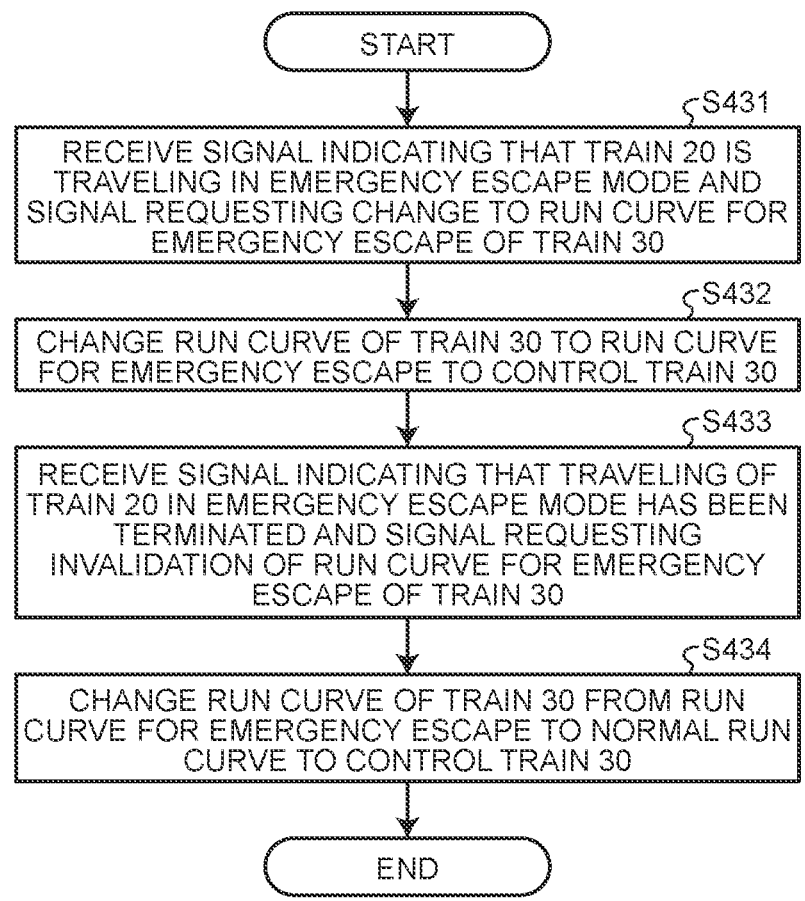
FIG. 12 is a flowchart illustrating an operation of an on-board control device of the train control system 1 according to the second embodiment.

FIG. 12 is a diagram that describes an operation of the on-board control device 300 of the train 30 of the train control system 1 according to the second embodiment. The on-board control device 300 receives, from the ground control device 60, the signal indicating that the train 20 is traveling in the emergency escape mode, and the signal requesting a change of the run curve to a run curve for emergency escape of the train 30 (S431). The on-board control device 300 changes the run curve of the train 30 to a run curve for emergency escape to control the train 30 (S432). The on-board control device 300 receives, from the ground control device 60, the signal indicating that traveling of the train 20 in the emergency escape mode has been terminated, and the signal requesting invalidation of the run curve for emergency escape (S433). The on-board control device 300 changes the run curve of the train 30 from the run curve for emergency escape to a normal run curve to control the train 30 (S434).

In this respect, the run curve for emergency escape is a run curve corresponding to the second run curve described in the first embodiment. The normal run curve used after the change from the run curve for emergency escape is a run curve corresponding to the third run curve described in the first embodiment.

The second on-board device predicts a second stop location of the second train, compares the second stop location predicted with the stop limit location of the second train, and when the second stop location is located ahead of the stop limit location of the second train in the travel direction of the second train, sends, to the ground control device, a signal indicating that the second train goes beyond the stop limit location of the second train, and a signal indicating that the run curve has been changed from the first run curve to the second run curve. This can provide safe travel control of a train traveling nearby.

When the second on-board device detects that the tail location of the second train has passed the first stop location, the second on-board device invalidates the second run curve, and generates a third run curve to control the second train. This can provide safe travel control of a train traveling nearby.

The train control system further includes a third on-board device installed on a third train traveling in a travel direction identical to the travel direction of the first train and of the second train, and traveling ahead of the second train. When the ground control device receives, from the second on-board device, the signal indicating that the second train goes beyond the stop limit location of the second train and the signal indicating that the run curve has been changed from the first run curve to the second run curve, the ground control device sends, to the third on-board device, a signal indicating that the second train is traveling in an emergency escape mode and a signal requesting a change of the run curve of the third train to a run curve for emergency escape. This can provide safe travel control of a train traveling nearby.

When the third on-board device receives, from the ground control device, the signal indicating that the second train is traveling in the emergency escape mode and the signal requesting a change of the run curve of the third train to the run curve for emergency escape, the third on-board device changes the run curve of the third train to the run curve for emergency escape to control the third train. This can provide safe travel control of a train traveling nearby.

Figure 13:
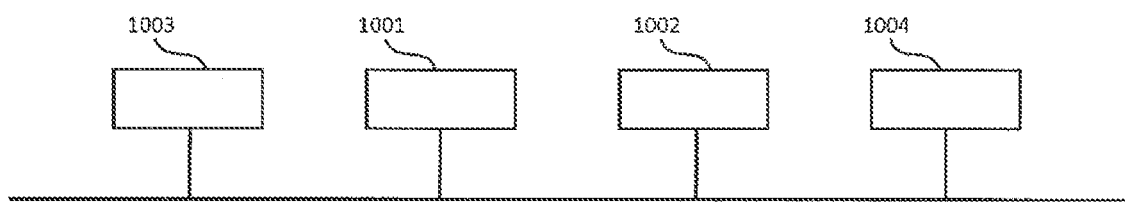
FIG. 13 is a diagram illustrating a typical example configuration of hardware for implementing the train control system according to the embodiments.

The ground control device 60 and the on-board control devices 100 (200 and 300) each include at least a processor, a memory, a receiver, and a transmitter. The operation of each of these devices can be implemented in software. FIG. 13 is a diagram illustrating a typical example configuration of hardware for implementing the ground control device 60 and the on-board control devices of the train control system 1 according to the first embodiment. The device illustrated in FIG. 13 includes a processor 1001, a memory 1002, a receiver 1003, and a transmitter 1004. The processor 1001 performs computation and control by software using received data. The memory 1002 stores received data or data necessary for the processor 1001 to perform computation and control, and also stores software. The receiver 1003 is an interface for receiving a signal or information input to the ground control device 60 or to any of the on-board control devices. The transmitter 1004 is an interface for sending a signal or information to be output from the ground control device 60 or from any of the on-board control devices. Note that the train control system 1 may include multiple ones of the processor 1001, the memory 1002, the receiver 1003, and the transmitter 1004.

Note that the embodiments of the present disclosure can be combined in any suitable manner, and parts of the embodiments can be modified or removed as appropriate within the scope of the invention.

REFERENCE SIGNS LIST 1, 2 train control system
10, 20, 30 train
50 track
60 ground control device
100, 200, 300 on-board control device
101 central unit
102 on-board wireless station
103 tachometer generator
104 pickup coil
105 brake control device
106 emergency brake control device
110 on-board device
1001 processor
1002 memory
1003 receiver
1004 transmitter

The invention claimed is:

1. A train control system comprising:
a first on-board device installed on a first train;
a second on-board device installed on a second train, the second train traveling in a travel direction identical to a travel direction of the first train and traveling ahead of the first train; and
a ground control device to provide control of the first train and of the second train based on an on-track location of the first train calculated in the first on-board device and on an on-track location of the second train calculated in the second on-board device, wherein
the first on-board device generates an emergency brake command to control an emergency brake unit installed on the first train when it is determined that an actual deceleration value of the first train is insufficient in comparison with a predetermined reference deceleration value, and the first on-board device predicts a first stop location of the first train based on the actual deceleration value, and sends a first signal indicating insufficient deceleration and a first stop location signal representing the first stop location predicted to the ground control device when it is determined that the actual deceleration value of the first train is insufficient in comparison with a predetermined emergency brake reference deceleration value, the ground control device receives the first signal and the first stop location signal from the first on-board device, and sends the first signal and the first stop location signal to the second on-board device, and the second on-board device receives the first signal and the first stop location signal from the ground control device, invalidates a first run curve that has been preset, over a range from a second train location to a stop limit location of the second train, and generates a second run curve to control the second train, the second train location representing the on-track location of the second train.

2. The train control system according to claim 1, wherein the second run curve is a run curve to provide control such that a train distance between the second train and the first train becomes larger than a train distance between the second train and the first train when the second train is controlled based on the first run curve.

3. The train control system according to claim 1, wherein the first on-board device determines that deceleration is insufficient when a difference between the emergency brake reference deceleration value and the actual deceleration value continues to be greater than or equal to a predetermined threshold for a predetermined time period.

4. The train control system according to claim 1, wherein the second on-board device invalidates the second run curve, and generates a third run curve to control the second train when the second on-board device detects that a tail location of the second train has passed the first stop location.

5. The train control system according to claim 1, wherein the second on-board device predicts a second stop location of the second train, compares the second stop location predicted with the stop limit location of the second train, and when the second stop location is located ahead of the stop limit location of the second train in the travel direction of the second train, sends, to the ground control device, a signal indicating that the second train goes beyond the stop limit location of the second train, and a signal indicating that a change has been made from the first run curve to the second run curve.

6. The train control system according to claim 5, wherein the second on-board device invalidates the second run curve, and generates a third run curve to control the second train when the second on-board device detects that a tail location of the second train has passed the first stop location.

7. The train control system according to claim 5, further comprising:

a third on-board device installed on a third train, the third train traveling in a travel direction identical to the travel direction of the first train and of the second train, and traveling ahead of the second train, wherein when the ground control device receives, from the second on-board device, the signal indicating that the second train goes beyond the stop limit location of the second train and the signal indicating that a change has been made from the first run curve to the second run curve, the ground control device sends, to the third on-board device, a signal indicating that the second train is traveling in an emergency escape mode and a signal requesting a change of a run curve of the third train to a run curve for emergency escape.

8. The train control system according to claim 7, wherein when the third on-board device receives, from the ground control device, the signal indicating that the second train is traveling in an emergency escape mode and the signal requesting a change of the run curve of the third train to the run curve for emergency escape, the third on-board device changes the run curve of the third train to the run curve for emergency escape to control the third train.

* * * * *